United States Patent Office

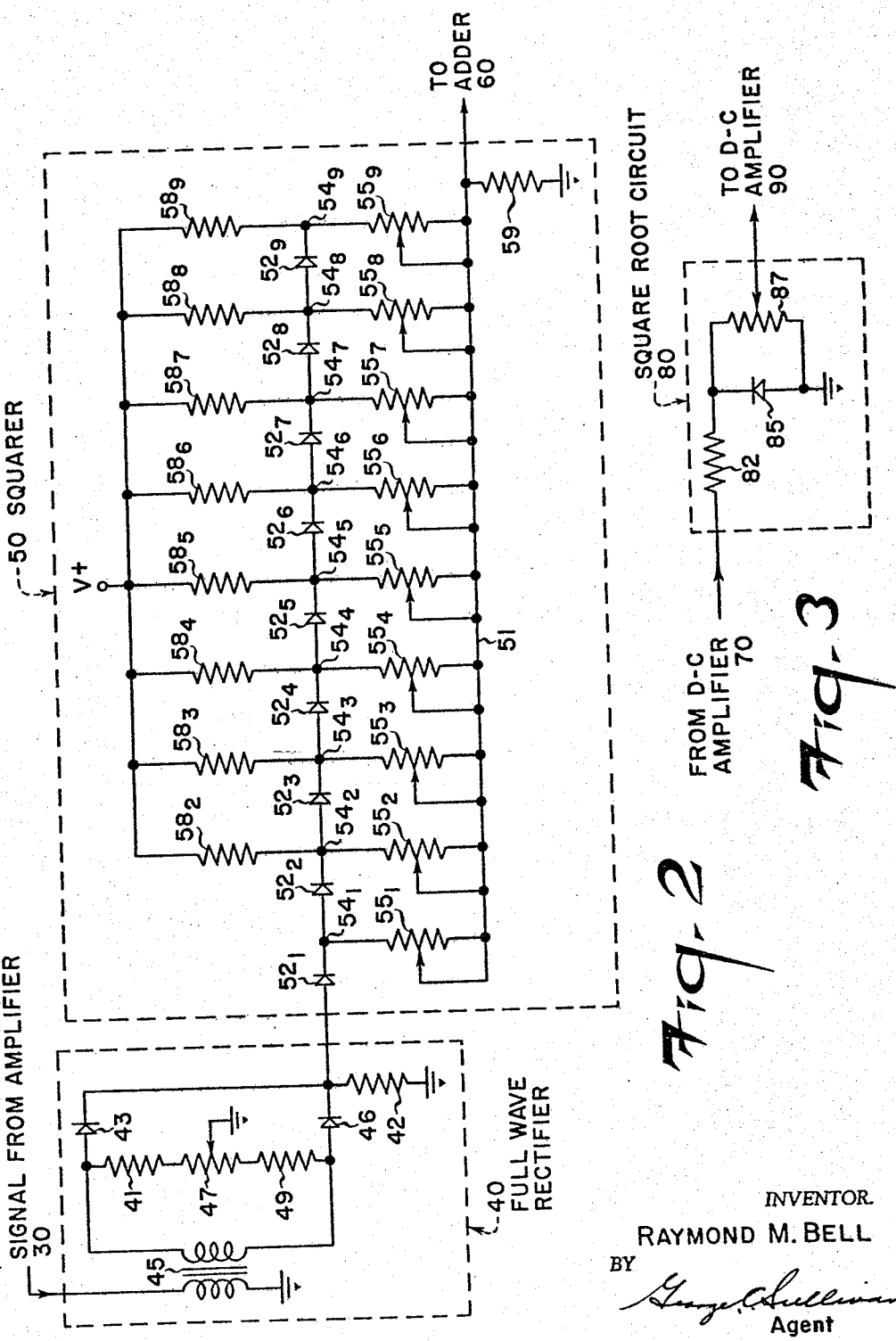

3,045,476
Patented July 24, 1962

3,045,476
VIBRATION TESTING DEVICE
Raymond M. Bell, Sunnyvale, Calif., assignor to Lockheed Aircraft Corporation, Burbank, Calif.
Filed Feb. 9, 1960, Ser. No. 7,970
6 Claims. (Cl. 73—71.6)

This invention relates to means and methods for vibration testing.

The need for vibration testing in the design and checkout of many types of apparatus and devices has taken on new importance in recent years. As a result, the manufacture and design of vibration test equipment and the problems associated therewith have been receiving increasing attention.

One of the most difficult problems associated with vibration testing arises because the classic single degree of freedom vibration condition which is required by most vibration test specifications is obtainable only in theory. This is chiefly because the unsymmetrical loading presented to a vibration table of a shaker by the shifting of the dynamic center of mass of a test specimen while under vibratoin, causes the resultant motion of the vibration table and specimen to be of a very complex nature, and not in the single direction which is ordinarily contemplated both by the vibration test equipment and the measuring apparatus. As a result it is impossible with present-day vibration equipment to determine just how much vibration a test specimen is experiencing, since the vibration reading of the equipment is ordinarily calibrated only for the condition where vibration is in a predetermined direction, and there is no provision for taking into account vibration which may be produced in other directions. In fact, it is not unusual for the vibration occurring on a test specimen in directions other than the intended one to be many times as great as the vibration occurring in the intended direction.

To overcome the above problem, a considerable effort has been made to design vibration equipment which will prevent vibration from occurring in directions other than the intended direction when the test specimen is vibrated. However, the shifting of the dynamic center of mass of the test specimen, which is practically unavoidable, has prevented any headway in this approach to the problem. Only by designing oversized and highly expensive vibration equipment where the load to be vibrated is so small as to have relatively no effect on the motion of the vibration equipment, has any success been achieved in restricting vibration to only a single predetermined direction.

In accordance with the present invention, a new approach to the solution of this problem is provided which makes it possible to accurately vibrate a test specimen at the vibration level required by a test specification. This approach involves the use of an auxiliary device which is capable of determining the resultant magnitude of vibration which a test specimen is experiencing, regardless of the direction of vibration, and then, by means of this determination permitting the vibration equipment to be automatically or manually adjusted to vibrate the test specimen at any desired predetermined level of vibration.

Accordingly, it is the broad object of this invention to provide improved means for vibration testing.

A more specific object of this invention is to provide a vibration test device which is capable of being used with available vibration testing apparatus so that a test specimen can be accurately vibrated at a predetermined level, regardless of the direction of vibration of the test specimen.

Another object of this invention is to provide an improved method for accurately vibrating a test specimen at a predetermined level of vibration, regardless of the direction of vibration thereof.

Still another object of this invention is to provide the above means and methods of the aforementioned objects in relatively simple, compact and inexpensive form.

The specific nature of the invention, as well as other objects, uses and advantages thereof, will clearly appear from the following description and from the accompanying drawing in which:

FIG. 2 is a circuit diagram of preferred embodiments of the full wave rectifier and squarer illustrated in block form in FIG. 1.

FIG. 3 is a circuit diagram of a preferred embodiment of the square root circuit shown in block form in FIG. 1.

Figure 1:
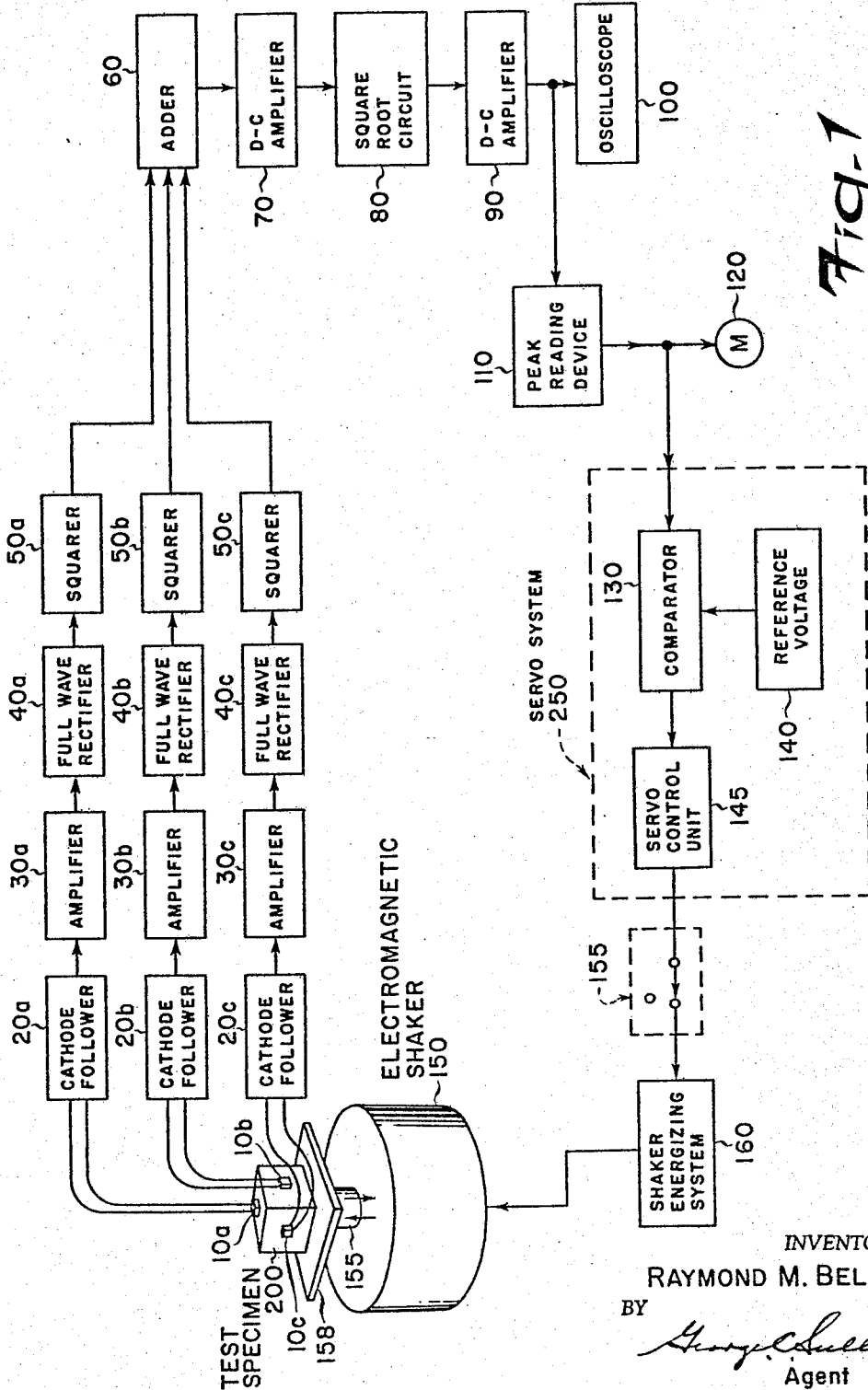
FIG. 1 is a block and schematic diagram of a vibration testing system in accordance with the invention.

In FIG. 1, a conventional form of vibration testing apparatus is indicated by the electromagnetic shaker 150, the shaker energizing system 160 and the vibration table 158 to which a test specimen to be vibrated is mounted such as indicated at 200 in FIG. 1. A coupling shaft 155 couples the vibration table 158 to the shaker 150.

In accordance with conventional practice the shaker energizing system 160 is adjusted so that it causes the electromagnetic shaker 150 to vibrate the vibration table 158 at a rate and displacement in the direction shown by the arrows such that a desired acceleration (commonly measured in g's, where g is the acceleration of gravity) will be applied to the test specimen 200. However, as explained previously, the shifting of the dynamic center of mass of the test specimen 200 which unavoidably occurs produces a situation where the test specimen 200 may be accelerated in directions other than the direction provided by the electromagnetic shaker 150. The shaker energizing system 160 is able to control the vibration in the intended direction, but has no provision for controlling the vibration occurring in other directions. Thus, it will be appreciated that even though the shaker energizing system 160 of a conventional vibration testing system is set to provide a predetermined amount of vibration at which a test specimen is to be vibrated, the resultant vibration which the test specimen 200 is experiencing may be very much different from that desired.

Consequently, in accordance with the present invention, the remaining elements shown in block form in FIG. 1 are provided to provide a solution to this problem. First three orthogonally located accelerometers 10a, 10b and 10c are suitably mounted to the test specimen 200 or to the shaker 150 to provide an indication of the actual acceleration which the test specimen 200 is experiencing in three mutually perpendicular directions. The outputs from these accelerometers 10a, 10b and 10c are then respectively fed to three channels which operate on each of these signals so that they can be combined in a manner which will provide an output indication which is indicative of the resultant acceleration which the test specimen 200 is experiencing. This indication of the resultant acceleration of the test specimen may then be used to adjust the shaker energizing system 160 to provide the desired level of acceleration. Or, by means of a suitable servo system 250 comprising a comparator 130, a reference voltage 140 and a servo control unit 145, the shaker energizing system 160 may be caused to automatically provide the desired level of vibration.

Each of the channels to which the outputs of the accelerometers 10a, 10b and 10c are respectively fed comprise a cathode follower 20, an amplifier 30 to which the output of the cathode follower 20 is fed, a full wave rectifier 40 to which the output of the amplifier 30 is fed and a squarer 50 to which the output of the full wave rectifier 40 is fed. The letters a, b and c following the numbers 20, 30, 40 and 50 in FIG. 1 distinguish between the three channels.

The outputs of the squarers 50a, 50b and 50c of the three channels are fed to an adder 60 which adds the outputs of these squarers and then feeds the resultant signal to a D.-C. amplifier 70 which amplifies the signal to a sufficient magnitude to operate a square root circuit 80. The square root circuit 80 takes the square root of the output signal from the D.-C. amplifier 70 and then feeds it to another D.-C. amplifier 90. The output of the D.C. amplifier 90 is then a signal which varies in accordance with the resultant acceleration the test specimen 200 is experiencing. An oscilloscope 100 is connected to the output of the D.-C. amplifier 90 so that the instantaneous acceleration can be observed.

For most vibration testing, the only figure of importance is the maximum acceleration which the test specimen is experiencing and this can be obtained by means of a peak reading device 110 which provides an output corresponding to the peak of the input signal applied thereto. The time constant of the peak reading device 110 is chosen so that the peaks appearing at the output of the D.-C. amplifier 90, corresponding to the negative and positive accelerations, are measured. The output of the peak reading device 110 may then be applied to a meter 120 which may be suitably calibrated in terms of acceleration. Preferably, the output of the peak reading device is fed to a servo system 250 comprising the comparator 130, the reference voltage 140, and the servo control unit 145, which cooperate with the shaker energizing system 160 to determine the energizing signal applied to the electromagnetic shaker 150. The switch 155 permits the servo system to be disconnected.

A better understanding of the elements shown in block form in FIG. 1 may now be obtained from the following description of the operation of the system. First, the shaker energizing system 160 is adjusted as is conventionally done so that its output is adapted to cause the electromagnet shaker 150 to vibrate the vibration table 158 in a manner which will cause the test specimen 200 to experience a predetermined acceleration. As explained previously, such a setting is usually highly inaccurate because of acceleration which may occur in other directions as a result of the shifting of the dynamic center of the test specimen 200, which the shaker energizing system 160 normally has no way of accounting for.

In the present invention, however, as shown by the system in FIG. 1, means are provided for accounting for this acceleration which usually occurs in other than the intended direction. The three orthogonal accelerometers 10a, 10b and 10c provide output signals corresponding to the acceleration which the test specimen 200 is experiencing in three mutually perpendicular directions. The cathode follower 20 and amplifier 30 of each channel then amplifies the output signals from its respective accelerometer 10 to a sufficient level to operate the full wave rectifier 40 and the squarer 50. It is important that the full wave rectifier and squarer 40 and 50 of each channel be constructed and arranged so that they effectively maintain the phase relationships of the output signals from their respective accelerometers, so that, when they are added by the adder 60, an output is produced corresponding ot the sum of the square of the accelerations which the test specimen 200 is experiencing at a given instant of time. The use of the full wave rectifier in each channel is advantageous in that it permits both the positive and negative accelerations which the test specimen 200 is experiencing to be accounted for in the final output from the adder 60.

The output of the adder 60 is then fed to a D.-C. amplifier 70 which raises the signal to a sufficient level to operate the square root circuit 80. The output from the square root circuit 80 is then a signal corresponding to the instantaneous resultant acceleration which the test specimen 200 is experiencing. The D.-C. amplifier 90 to which this signal is then fed amplifies it to a suitable level so that it may be visually observed on the oscilloscope 100 or converted to a peak reading value by the peak reading device 110 to which the meter 120 is connected. If the servo system is disconnected, that is, if the switch 155 is opened, an operator of the system may then read the meter 120 and adjust the shaker energizing system 160 until the reading on the meter 120 corresponds to the peak acceleration at which it is desired that the test specimen 200 be vibrated. Such a manual adjustment is satisfactory in many cases, but has the undesirable feature that the adjustment may drift with time and will have to be changed each time the energizing signal to the shaker 150 is changed.

If the servo system 250 is connected in the system by closing the switch 155, the system will automatically maintain a predetermined level of acceleration. The operation of the system will then be as follows. The energizing system is adjusted as before and the reference voltage 140 is then set to a value corresponding to the desired maximum peak acceleration at which it is desired that the test specimen 200 be vibrated. As previously described the output of the peak reading device is a signal representing the maximum resultant acceleration which the test specimen 200 is experiencing. This signal is fed to the comparator 130 where it is compared with the reference voltage 140 and providing an output signal having one polarity when the peak holder output is greater than the reference voltage and having opposite polarity when the peak holder voltage is less than the reference voltage. This error signal is fed to a conventional type of servo control unit 145 which is adapted to cooperate with the shaker energizing system 160 to change its output in a direction which will cause the output voltage from the peak reading device 110 to become equal to the reference voltage 140. The modifications of the shaker energizing system 160 which would be required to provide this type of operation may be provided in a variety of ways which are well known in the art. For example, the servo control unit 145 may be adapted to increase the output of the shaker energizing system 160 when the output from the peak reading device 110 is less than the reference voltage 140 as indicated by the polarity and magnitude of the error signal output of the comparator 130, while decreasing the output of the shaker energizing system 160 when the peak voltage from the peak reading device 110 is less than the reference voltage 140, as indicated by the polarity and magnitude of the error signal output from the comparator 130.

It is to be understood in connection with this invention that the elements of FIG. 1, which are shown in block form, are basically well known in the art and can be provided in a variety of ways. Since this invention resides chiefly in the novel combination of these well known elements, the construction thereof will not be described in detail. However, based upon the above description of the system and its operation, those skilled in the art will readily be able to provide the system shown in FIG. 1 in a variety of forms.

As was mentioned previously, it is important that the system shown in FIG. 1 maintain the phase relationship between the outputs from the accelerometers 10a, 10b and 10c and take into account the effect of acceleration in both positive and negative directions. Most advantageous circuitry for this purpose is shown in FIG. 2 which because of its simplicity greatly adds to the usefulness of the present invention. In FIG. 2, the circuit diagram of the full wave rectifier 40 and the squarer 50 of each of the three channels are shown in detail. It can be seen that the signal from the amplifier 30 is fed to the primary of a transformer 45 having a resistor 41, a potentiometer 47 and a resistor 49 connected across the secondary thereof in that order. The potentiometer 47 has its variable arm connected to circuit ground so that the ground point of the circuit can be adjusted, thereby permitting simple control of the zero acceleration point. Diodes 43 and 46 are then connected at opposite ends of the secondary of the transformer 45 and are poled to permit positive current flow from both ends of the secondary winding to a load resistor 42 so as to develop a full wave rectified voltage thereacross corresponding to the positive and negative accelerations which the test specimen 200 is experiencing. This full wave rectified voltage is then fed to the input of the squarer 50.

The squarer 50 comprises a plurality of stages which produce an output signal across a load resistor 59 approximating the square of the instantaneous full-wave rectified signal appearing across the resistor 42. Each stage, except the first stage, has three components meeting at a junction 54, these components being a diode 52 having its cathode connected to the junction 54 and its anode connected to the junction 54 of the previous stage, a bias resistor 58 connected between the junction 54 and a source of positive D.-C. voltage V+, and a potentiometer 55 having one end connected to the junction 54 and the variable arm and the other end of the potentiometer 55 connected to the output lead 51 which is common to all of the nine stages of the squarer 50. The first stage has the resistor 58 omitted. The load resistor 59 across which the resultant squared output appears is connected between the output lead 51 and circuit ground, the output lead 51 being fed to the adder 60. The numbered subscripts of the components in FIG. 2 distinguish the components of the various stages.

Squarer operation is now provided as follows. Each of the stages are adjusted (by adjusting the values of the resistors 58 and the potentiometers 55) so that the voltage appearing at its junction 54 is a predetermined amount greater than the voltage at the previous junction. For example, the voltage at the junctions 54 may differ by 0.5 volts. The voltage at the first junction $54_1$ is zero since it has no bias resistor 58; the voltage at the second junction $54_2$ will then be 0.5 volt, the voltage at the third junction $54_3$ will then be 1 volt, the voltage at the fourth junction $54_4$ will then be 1.5 volts, and so on, with the voltage at the ninth voltage $54_9$ being 4.0 volts. Thus, when the input voltage of the squarer 50 is between zero and .5 volt, the diode $52_2$ will be reversed biased and the input voltage will cause current to flow only through the diode $52_1$ and the potentiometer $55_1$ to the common lead 51 to produce a voltage across the resistor 59. The potentiometer $55_1$ is adjusted so that the slope of the output signal across the resistor 59 for input voltages of less than 0.5 volt has a value equal to the average slope that a squared slope output signal would have in this region. When the input to the squarer 50 is between 0.5 and 1.0 volt, current will flow only through the diodes $52_1$ and $52_2$, since the diode $52_3$ will still be reverse biased. The current flowing to the lead 51 to produce the voltage across the resistor 59 will then be the sum of the currents flowing through the potentiometers $55_1$ and $55_2$, and not merely just the current flowing through the potentiometer $55_1$ as before. The potentiometer $55_2$ is adjusted so that the added current flowing to the resistor 59 when the input voltage is between 0.5 and 1.0 volt produces a voltage across the resistor 59 having a slope equal to average slope that a squared output signal would have in this region. For input voltages between 1.0 and 1.5 volts, the additional current flowing to the resistor 59 as a result of current now flowing through the diode $52_3$ is chosen to have a value so that the slope of the output voltage across the resistor 59 is equal to the average slope that a squared output signal would have in this region. Likewise, the remaining stages are adjusted so that the slope of the output voltage across the resistor 59 is equal to the average slope that a squared output signal would have in each 0.5 volt region of operation. The voltage at the junction $54_9$ determines the maximum input voltage for which squaring of the input signal will be obtained. The result is that the squarer 50 effectively produces an output signal made up of a plurality of linear segments which approximates the instantaneous square of the input voltage applied thereto between zero and a predetermined input voltage. The nine stages shown in FIG. 2 have been found adequate to approximate a squaring function for the purposes of this invention. If greater accuracy is required more stages could be used. In a typical embodiment of the full-wave rectifier 40 and the squarer 50 shown in FIG. 2, the components may have the following values:

| Component | Unit | Value |
|---|---|---|
| Diodes 43, 46, and $52_1$ through $52_9$ | diodes | 1N39 |
| Potentiometer $52_1$ | ohms | 250,000 |
| Potentiometers $52_2$ and $52_3$ | do | 100,000 |
| Potentiometer $52_4$ | do | 75,000 |
| Potentiometers $52_5$, $52_6$ and $52_7$ | do | 50,000 |
| Potentiometer $52_8$ | do | 20,000 |
| Potentiometer $52_9$ | do | 10,000 |
| Resistor $58_1$ | do | 10,000,000 |
| Resistor $58_2$ | do | 7,500,000 |
| Resistor $58_3$ | do | 3,600,000 |
| Resistor $58_4$ | do | 1,500,000 |
| Resistor $58_5$ | do | 750,000 |
| Resistor $58_6$ | do | 330,000 |
| Resistor $58_7$ | do | 130,000 |
| Resistor $58_8$ | do | 43,000 |
| Resistor 59 | do | 1,000 |
| D.-C. voltage V+ | volts | 40 |
| Resistors 41 and 49 | ohms | 180 |
| Potentiometer 47 | do | 100 |
| Resistor 42 | do | 10,000 |
| Transformer 45 | | TRIAD-HSM 85 |

In FIG. 3, an embodiment of a simple square root circuit is illustrated which may be used for the square root circuit 80 shown in block form in FIG. 1. The square root circuit 80 in FIG. 3 comprises a resistor 82 in series with the parallel combination of an unbiased diode 85 and a potentiometer 87. The non-linear characteristic of the diode 85 produces a voltage thereacross which is proportional to the square root of the current flowing thereto from the D.-C. amplifier 70. The potentiometer 87 permits a predetermined portion of this square root signal to be applied to the D.-C. amplifier 90.

It is to be understood that various modifications and variations are possible and the invention is not limited to the particular embodiments illustrated and described herein. The invention is to be considered as including all possible modifications and variations that can be made in construction and arrangement within the scope of the invention as defined in the appended claims.

I claim as my invention:

1. Vibration testing means comprising in combination: a shaker, means on said shaker to which a test specimen can be mounted for vibration, energizing means for said shaker, means operatively connected to said shaker for producing signals corresponding to the acceleration produced by said shaker in each of three mutually perpendicular directions, means to which said signals are fed for producing a resultant signal corresponding to the square root of the sum of the squares of each of said signals, and servo means to which said resultant signal is fed, said servo means adapted to cooperate with said energization means to maintain said resultant signal at a predetermined value.

2. In combination with vibration testing apparatus comprising a shaker, means on said shaker to which a test specimen is mounted for vibration, and energizing means for said shaker, the improvement comprising: three orthogonally disposed accelerometers operatively connected to said test specimen for producing three signals respectively corresponding to the acceleration produced on said test specimen by said shaker in each of three mutually perpendicular directions, means including a full-wave rectifier and a squarer to which each of said signals are successively fed, adding means to which the output of each squarer is fed to produce a signal corresponding to the sum of the squares of each of said three signals, means for taking the square root of the output signal from said adder to produce a signal coresponding to the resultant acceleration which the shaker is producing, and indicating means to which said last mentioned signal is fed.

3. In combination with vibration testing apparatus comprising a shaker, means on said shaker to which a test specimen can be mounted for vibration, and energizing means for said shaker, the improvement comprising: three orthogonally mounted accelerometers for producing three signals respectively corresponding to the acceleration produced by said shaker in each of three mutually perpendicular directions, means including a full-wave rectifier and a squarer to which each of said signals are successively fed, adding means to which the output of each squarer is fed to produce a signal corresponding to the sum of the squares of each of said three signals, means for taking the square root of the output signal from said adder to produce a signal corresponding to the resultant acceleration which the shaker is producing, indicating means to which said last mentioned signal is fed, and servo means to which last mentioned signal is also fed, said servo means adapted to cooperate with said energization means to maintain said last mentioned signal at a predetermined value.

4. The invention in accordance with claim 3 wherein each squarer comprises a plurality of parallel connected stages to which the respective input signal to each squarer is fed, each of said stages having a diode biased at a predetermined level which is a predetermined amount greater than the predetermined level at which the diode of the previous stage is biased, and resistance means in each stage which determines the amount of current flow through the stage when the diode of the stage conducts, said resistance means of said stages arranged in a ladder network with the diodes of each of said stages successively positioned and similarly poled on one side thereof, said resistance means being chosen in cooperation with the predetermined level at which each diode is biased so that the output of said squarer approximates the instantaneous square of its input.

5. A method for accurately determining the resultant acceleration which a test specimen is experiencing regardless of the direction of vibration thereof, said method comprising: producing three signals respectively corresponding to the acceleration which the test specimen is experiencing in each of three mutually perpendicular directions, full-wave rectifying and squaring each of said signals, adding the three signals thereby produced, and then taking the square root of the three added signals to produce a signal corresponding to the resultant acceleration which the test specimen is experiencing.

6. In a vibration testing systeming having a reciprocating shaker, energizing means for said shaker, and means on said shaker to which a test specimen is mounted for vibration, the method of operating said system so that a test specimen can be vibrated at a predetermined level of acceleration regardless of the direction thereof, said method comprising: producing three signals respectively corresponding to the acceleration which the test specimen is experiencing in each of three mutually perpendicular directions, full-wave rectifying and squaring each of said signals, adding the three signals thereby produced, taking the square root of the three added signals to produce a signal corresponding to the resultant acceleration which the test specimen is experiencing, and then adjusting the energizing means to provide resultant signals of predetermined magnitude.

References Cited in the file of this patent

UNITED STATES PATENTS

| | | |
|---|---|---|
| 2,500,764 | MacGeorge | Mar. 14, 1950 |
| 2,613,071 | Hansel | Oct. 7, 1952 |
| 2,675,698 | Johnson | Apr. 20, 1954 |
| 2,844,777 | Ross | July 22, 1958 |
| 2,892,152 | Buisson | June 23, 1959 |

OTHER REFERENCES

MB Vibration Notebook Article, by Panariti, vol. 5, No. 5, pgs. 1–3, October, 1959—Published by MB Electronics, P.O. Box 1825, New Haven 8, Conn. (Copy in 73–71.6.)